United States Patent [19]
Cornell et al.

[11] 3,990,129
[45] Nov. 9, 1976

[54] MULTI-CABLE CONNECTOR

[75] Inventors: Paul V. Cornell, Amherst, Mass.; Paul A. Cornell, Knockanore, Ireland

[73] Assignee: Electro-Clamp Corporation, Beverly Hills, Calif.

[22] Filed: Jan. 16, 1976

[21] Appl. No.: 649,654

[52] U.S. Cl. .......................... 24/81 CC; 24/132 R; 24/132 LS; 24/115 G; 339/266 R; 339/274; 403/186
[51] Int. Cl.² ................... A44B 21/00; F16G 11/04
[58] Field of Search .......... 24/135 K, 81 CC, 115 R, 24/115 G, 115 AA, 115 AB, 115 AC, 115 LS, 115 WL, 249 LS; 339/266 R, 274; 403/186

[56] References Cited
UNITED STATES PATENTS

| | | | |
|---|---|---|---|
| 3,675,182 | 7/1972 | Gregory | 339/274 |
| 3,801,952 | 4/1974 | Lawlor | 24/132 R |

*Primary Examiner*—Bernard A. Gelak
*Attorney, Agent, or Firm*—Hume, Clement, Brinks, Willian, Olds & Cook, Ltd.

[57] ABSTRACT

A cable connector is disclosed having the capacity to secure simultaneously a number of cables or wires having different diameters. The connector includes a common male member and a plurality of female members adapted to rotate thereon and means for providing to each clamping element a variable clamping capability.

11 Claims, 11 Drawing Figures

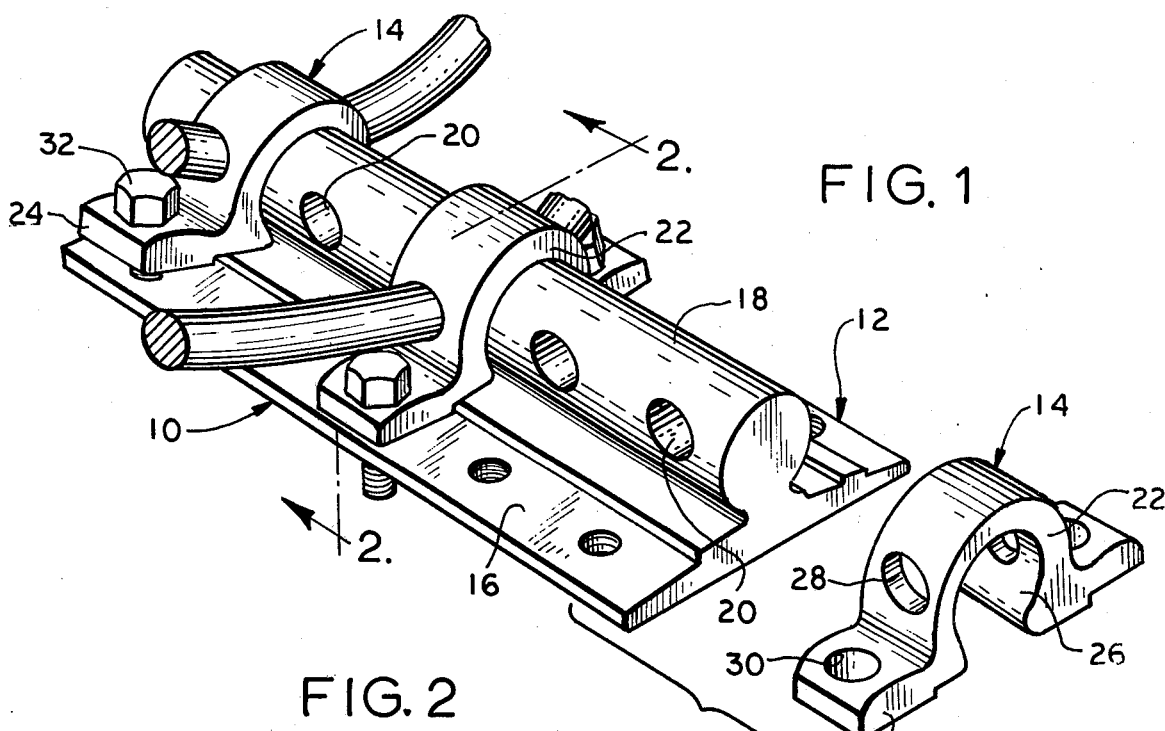
FIG. 1
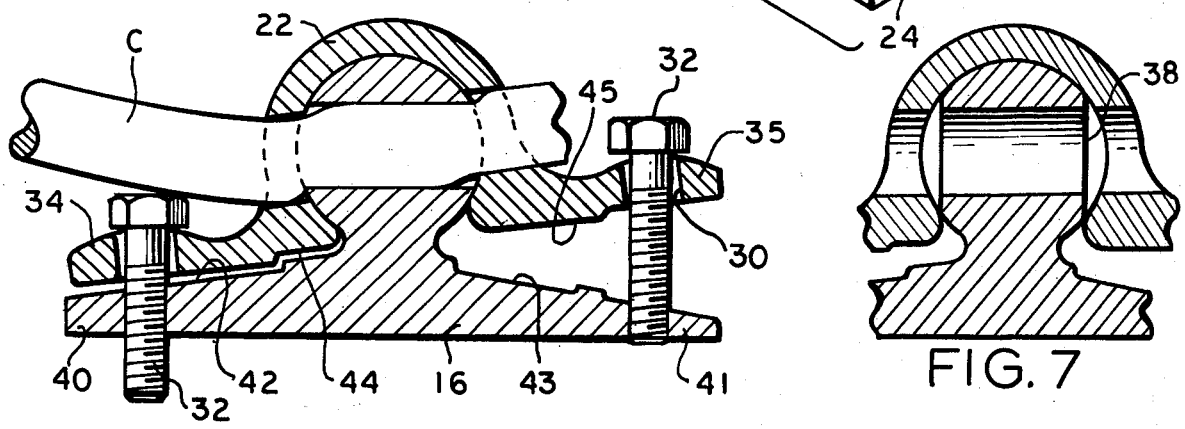
FIG. 2
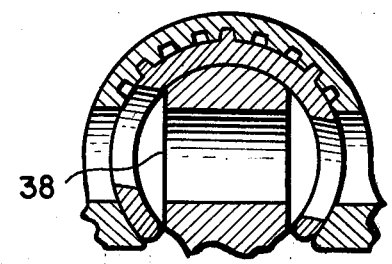
FIG. 7
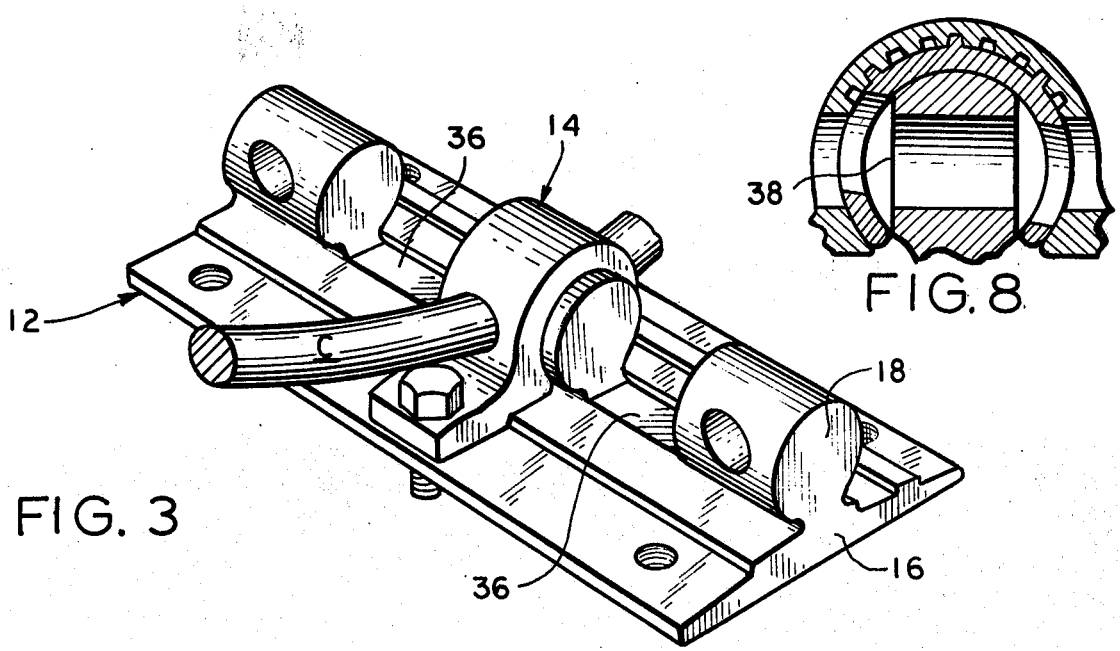
FIG. 3
FIG. 8

MULTI-CABLE CONNECTOR

BACKGROUND OF THE INVENTION

The present invention relates to an improved clamping device, and particularly to a clamping device of the rotary jaw type adapted to accomodate a plurality of cables, wires or the like. In addition, the present invention relates to means for providing variable clamping capability to such clamping devices in order to accommodate cables and/or wires of varying diameters.

Although cable-clamping devices of the rotary jaw type are well known in the art and have met with considerable success, conventional clamps have a number of shortcomings. For example, prior art clamps are not capable of receiving a plurality of cables, each of which may be individually secured in a single clamping element which is capable of receiving the cable from either side. In addition, conventional clamps do not suitably provide for variable clamping capability which is necessary for receiving cables of varying diameters.

Accordingly, the present invention is directed to a device capable of clamping, simultaneously, a plurality of cables of either the same or different sizes. Moreover, the cables may be receives from either or both sides of the clamping device wihtout the need for duplicative sets of clamps.

Generally, the clamping device of the present invention includes a single elongated male member and a plurality of female members, each female member cooperating with a longitudinal portion of the male member to form an individual clamping element. The female member may be designed to accept a cable from either side and, in accordance with a preferred embodiment of the invention, the male member may be designed to allow the simple and expeditious reversal of an individual female member to accomodate acceptance of a cable from either side.

Means may also be employed to provide each clamping element with variable clamping capability. For example, means to control the angular rotation of the female member may be utilized to accurately regulate the clamping forces applied to a given cable. Alternatively, means may be incorporated into each clamping element to allow the modification of the size of the cable-receiving opening therein.

BRIEF DESCRIPTION OF THE DRAWINGS

The novel features which are characteristic of the present invention are included herein in the appended claims. The invention, itself, however, together with further objects and attendant advantages thereof will be more readily understood by reference to the following disclosure taken in connection with the drawings, in which:

FIG. 1 is a perspective view showing a cable-clamping device embodying several features of the present invention and illustrating the clamping of a plurality of cables each being received by the device from opposite direction;

FIG. 2 is a cross-sectional view taken along line 2—2 of FIG. 1;

FIG. 3 is also a perspective view illustrating another embodiment of the present invention;

FIGS. 7 and 8 are cross-sectional views illustrating a preferred embodiment wherein the female member may be easily and expeditiously reversed.

DETAILED DESCRIPTION OF THE INVENTION

Figure 4:
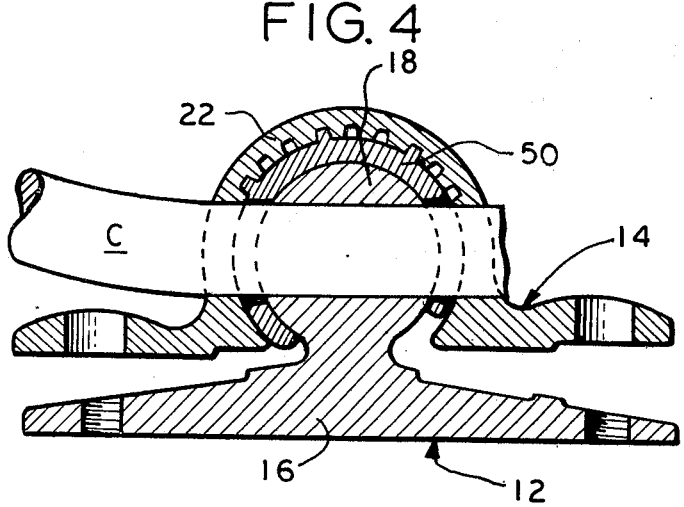
FIGS. 4–6 and 4a–6a are cross-sectional views of a preferred embodiment, illustrating the variable clamping capability of the present invention.
Figure 4A:
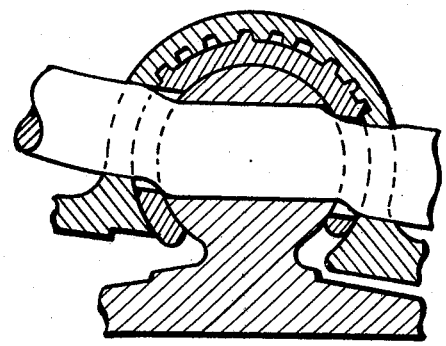

Referring to FIG. 1, the improved clamping device, designated generally at 10, includes a male member 12 and a plurality of female members 14. The male member includes an elongated base 16 and a generally cylinderical male head 18 extending longitudinally on the base 16. The male head has a plurality of transverse cable-receiving bores 20. The female members 14 each includes a sleeve 22 and at least one mounting tail 24 extending therefrom. The sleeve 22 has a cable-receiving bore 28 and a cylindricel interior surface 26 which rotationally engages the male head 18.

Each of the female members 14 is aligned with a male bore 20 to form an individual cable-clamping element. The male and female bores 20 aand 28 are positioned on thier respective members such that the bores are linearly aligned to receive a cable when the female member is in the open position but offset to effect clamping forces on the cable when the female member has been rotated to the closed position.

In accordance with the embodiments of the invention illustrated in the drawings, the female member 14 has two mounting tails 24 each extending from opposite sides of the sleeve 22. The mounting tails 24 have an aperture 30 to accommodate a bolt 32 used to rotate the female member 14 to the closed position, thereby applying clamping forces to cable C. The bolts 32 may also be used to secure the entire clamping device to a support structure or, alternatively, the base 16 of male member 12 may be secured to the support by independent means. Of course, other means for rotating the female member will be apparent to those skilled in the art, and the bolt 32 is used herein merely for purposes of illustration. The tails 24 also preferably include generally convex upper surfaces 34, as is clearly shown in FIG. 2, which assure smooth, free rotation of member 14 upon tightening of the bolt 32.

The use of a double tailed female member 14 allows the clamping device 10 to accept cables from either side thereof without having to remove and reverse the female members 14. On the other hand, the manufacture of such female members is more costly due to the use of additional material. Accordingly, it is desirable that a gang connector have means which allows the expeditious reversal of conventional single-tail female members. The embodiments of the present invention illustrated in FIGS. 3, 7 and 8 illustrate preferred structures which provide such flexibility.

In FIG. 3 the male head 18 is provided with open portions 36 intermediate the transverse bores 20. The open portions 36 have a width slightly larger than the width of the female members 14 to allow the removal of any individual female member without having to disengage any other clamping element.

FIGS. 7 and 8 illustrate a particularly preferred embodiment in which the male head is provided with flattened side surfaces 38. The surfaces 38 may extend along the entire length of the male head 18 or may be positioned coincident with the transverse bores 20. As will be appeciated by those skilled in the art, the flattened surfaces 38 give the male head 18 a lateral dimension sufficiently narrow to allow vertical removal of the female member 14, yet these surface replace only a limited segment of the circumferential surface of the male head 18 so as not to impede the rotation of the female member 14 and the development of appropriate clamping forces. This embodiment of the present invention allows the individual clamping elements to be placed immediately adjacent one another, thereby minimizing the length of the clamping device 10, while at the same time allowing removal and/or reversal of a single female member 14 without disengaging any other clamping element.

A further feature of the present invention relates to its variable clamping capability. Thus, the clamping device of the present invention is able to provide appropriate clamping forces to engage cables of varying diameters.

One manner in which such variable clamping capabaility may be obtained is to control or regulate the degree of rotation of the female member 14 relative to the male member 12. The degree to which the member 14 may rotate is important to the proper operation of the clamping device, since, for a cable of a given diameter, too little rotation may result in ineffective securement of the cable, while too much rotation may cause sufficient shear forces to develop to break or damage the cable.

In accordance with the present invention, effective rotational control may be obtained by providing the male base with lateral portions, 40 and 41, having upper surfaces 42 and 43, respectively, which diverge downwardly from the male head 18 at different angles from the horizontal. Alternatively, the female mounting tails, 34 and 35 in FIG. 2, may extend from the sleeve 22 at different angles from the horizontal.

Still another means for regulating rotation of the member 14 is shown in FIG. 2. The upper surfaces 42 and 43 have different cross-sectional configurations as do the lower surfaces 44 and 45 of the mounting tails 34 and 35. These surfaces are so configured such that, when the member 14 is reversed on the male head 18, the female member 14 will rotate to different angular displacements. Accordingly, by using variously configured female members, a great number of different size cables may be properly secured in the clamping device of the present invention.

Variable clamping capability may also be obtained through the practice of another preferred embodiment of the present invention illustrated in FIGS. 4–6 and 4a–6a.

In accordance with this embodiment, a ring 50 is placed between the male head 18 and the female sleeve 22 to adjust the size of the cable-receiving opening in each clamping element. The ring 50 has a generally diametrical bore and is positioned between the male and female members such that the bore will at least partially align with the male and female bores. The ring 50 is also provided with means to prevent its rotational displacement relative to either the male or female member. A preferred structural arrangement for prevention of rotational displacement is illustrated in the drawings and includes at least one axial rib 52 on the exterior surface of the ring and a plurality of axial grooves 54 in the female sleeve 22.

Figure 5:
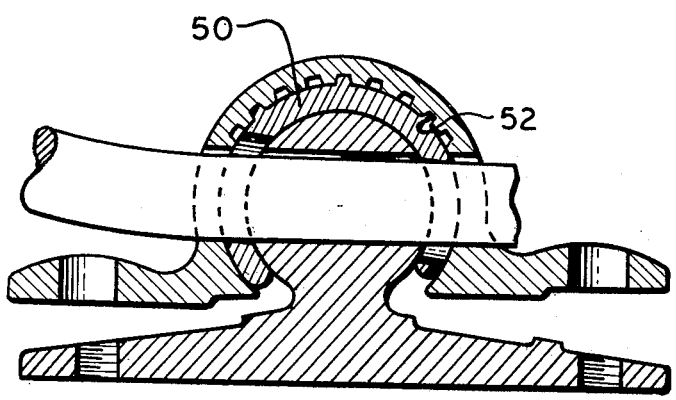
Figure 5A:
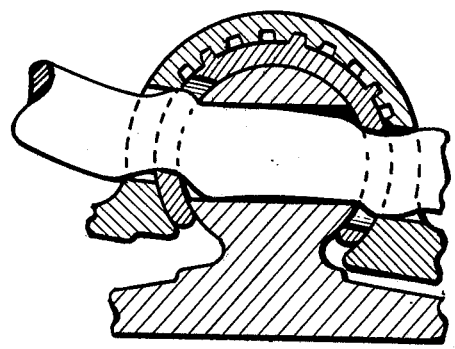
Figure 6:
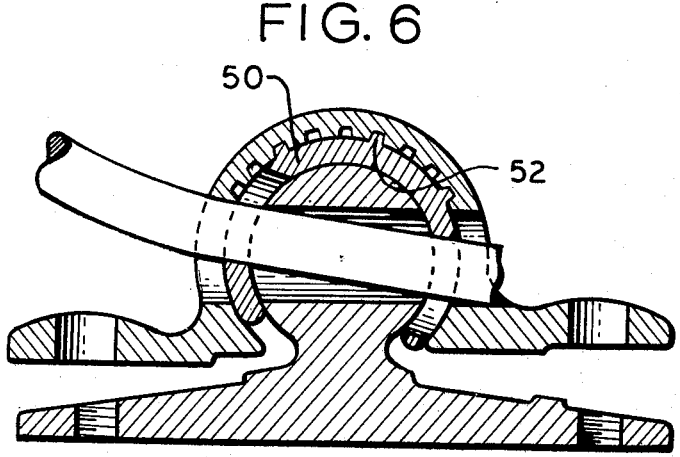
Figure 6A:
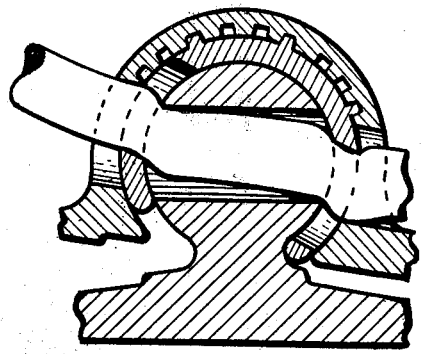

Thus, by insertion of the ring 50 between the male and female members the area of the cable-receiving bore of the individual clamping elements may be adjusted to accomodate cables of varying diameters. This feature is illustrated in FIGS. 4–6 wherein cables of different diameters are inserted into opening clamping elements with their respective insert rings 50 appropriately positioned. As is shown in FIGS. 4a–6a, each of these clamping elements provides a suitable clamping force on its received cable even though the rotational displacement of the female member 14 is constant in each case. Further features and advantages of this embodiment of the present invention, together with a more detailed description of its structural arrangement and alternative embodiments thereof, may be derived by reference to our copending U.S. patent application entitled "Clamping Device With Adjusting Ring".

Of course, it should be understood that various changes and modifications to the preferred embodiments described herein will be apparent to those skilled in the the art. Such changes and modifications can be made without departing from the spirit and scope of the present invention and without diminishing its attendant advantages. It is, therefore, intended that such changes and modifications be covered by the following claims.

We claim:

1. A device capable of clamping a plurality of cables or wires comprising:

a single male member having an elongated base and a generally cylindrical head extending longitudinally on said base, said head having a plurality of transverse cable-receiving bores;

a plurality of female members each having a sleeve and at least one mounting tail extending from said sleeve, said sleeve having a cylindrical interior surface which rotationally engages said male head and a cable-receiving bore;

each of said female members adapted to align with one of the male bores to form a single cable-clamping element;

said male and female bores being positioned such that said bores are linearly aligned when said female member is in the open cable-receiving position but offset from said linear alignment when said female member is in the closed cable-clamping position; and each said clamping element including means providing variable clamping capability.

2. The cable-clamping device of claim 1 wherein said variable clamping means comprises means for controlling the degree of rotation of said female member.

3. The cable-clamping -clamping device of claim 1 wherein the base of said male member has a laterally extending portion on each side of said male head and each said lateral portion has an upper surface which diverges downwardly from said male head at an angle to the horizontal different from that of said other lateral portion, whereby said female member may rotate through differing angles of rotation to provide said variable clamping capability.

4. The cable-clamping device of claim 1 wherein the base of said male member has a laterally extending portion on each side of said male head and each said lateral portion has an upper surface at a vertical position different from that of said other lateral portion, whereby said female member may rotate through differing angles of rotation to provide said variable clamping capability.

5. The cable-clamping device of claim 1 wherein said female member has two oppositely extending mounting tails each adapated to cooperate with a lateral portion of said male base; each said lateral portion having a different upper surface configuration and each said tail having a different lower surface configuration, whereby said female member may rotate through differing angles of rotation to provide said variable clamping capability.

6. A device capable of clamping a plurality of cables or wires comprising:
a single male member having an elongated base and a generally cylindrical head extending longitudinally on said base, said head having a plurality of transverse cable-receiving bores;
a plurality of female members each having a sleeve and at least one mounting tail extending from said sleeve, said sleeve having a cable-receiving bore and a cylindrical interior surface which rotationally engages said male head;
each of said female members adapted to align with one of the male bores to form a single cable-clamping element;
said male and female bores being positioned such that said bores are linearly aligned when said female member is in the open cable-receiving position but offset from said linear alignment when said female member is in the closed cable-clamping position; and
said male head including means intermediate its longitudinal ends for removing said female member therefrom.

7. The cable-clamping device of claim 6 wherein said member removing means comprises at least one open portion on said male head disposed between said male head bores, said open portion having a width slightly greater than that of said female members.

8. The cable-clamping device of claim 6 wherein member removing means comprises flattened side surfaces along at least a portion of the length of said male head.

9. The cable-clamping device of claim 1 wherein said variably clamping means includes a rotatably adjustable ring disposed between said male head and said female sleeve, said ring having a generally diametrical bore adapted to at least partially align with said male and female bores, and means for preventing rotational displacement of said ring relative to one of said members.

10. The cable-clamping device of claim 9 wherein said displacement prevention means includes at least one axially extending rib on the exterior surface of said ring and a plurality of axially extending grooves in said female sleeve.

11. The cable-clamping device of claim 1 wherein said female member has two mounting tails, each extending from said sleeve at an angle from the horizontal different from that of said other mounting tail, whereby said female member may rotate through differing angles of rotation to provide said variable clamping capability.

* * * * *